US012640972B2

(12) United States Patent
Hong et al.

(10) Patent No.: US 12,640,972 B2
(45) Date of Patent: May 26, 2026

(54) PREAMBLE SEQUENCE MAPPING METHOD AND APPARATUS, AND TERMINAL

(71) Applicant: VIVO MOBILE COMMUNICATION CO., LTD., Dongguan (CN)

(72) Inventors: Qi Hong, Dongguan (CN); Gen Li, Dongguan (CN); Kai Wu, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 468 days.

(21) Appl. No.: 18/134,561

(22) Filed: Apr. 13, 2023

(65) Prior Publication Data

US 2023/0254892 A1     Aug. 10, 2023

Related U.S. Application Data

(63) Continuation of application No. PCT/CN2021/123567, filed on Oct. 13, 2021.

(30) Foreign Application Priority Data

Oct. 16, 2020     (CN) .......................... 202011109242.6

(51) Int. Cl.
*H04L 27/26*     (2006.01)
*H04J 13/18*     (2011.01)
(Continued)

(52) U.S. Cl.
CPC .......... *H04L 27/2613* (2013.01); *H04J 13/18* (2013.01); *H04L 27/2675* (2013.01);
(Continued)

(58) Field of Classification Search
CPC ........... H04W 74/004; H04W 74/0833; H04W 74/0838; H04L 27/2675; H04L 27/2613;
(Continued)

(56) References Cited

U.S. PATENT DOCUMENTS

| | | | |
|---|---|---|---|
| 12,218,878 B2 * | 2/2025 | Lei ........................ | H04L 5/0044 |
| 2019/0150190 A1 * | 5/2019 | Kim ...................... | H04W 56/00 |
| | | | 370/329 |

(Continued)

FOREIGN PATENT DOCUMENTS

| | | |
|---|---|---|
| CN | 108322282 A | 7/2018 |
| CN | 110637496 A | 12/2019 |

(Continued)

OTHER PUBLICATIONS

Extended European Search Report issued in related European Application No. 21879442.8, mailed Mar. 13, 2024, 10 pages.
(Continued)

*Primary Examiner* — Redentor Pasia
(74) *Attorney, Agent, or Firm* — IPX PLLC

(57) ABSTRACT

A preamble sequence mapping method and a terminal are provided. The method includes: determining, by a terminal according to a rule for sorting T second preamble sequences, a target index of a second preamble sequence. The T second preamble sequences are all or some of sequences obtained after the terminal performs code-division on M first preamble sequences by using Q Orthogonal Cover Codes (OCCs). The method further includes establishing, by the terminal based on the target index of the second preamble sequence, mapping to a Synchronization Signal and Physical Broadcast Channel block (SSB). Q is an integer greater than or equal to 1. M is an integer greater than or equal to 1. T is an integer greater than or equal to 2.

17 Claims, 5 Drawing Sheets

(51) Int. Cl.

| | |
|---|---|
| *H04L 5/00* | (2006.01) |
| *H04W 74/00* | (2009.01) |
| *H04W 74/0833* | (2024.01) |
| *H04W 74/0838* | (2024.01) |

(52) U.S. Cl.
CPC ......... *H04W 74/004* (2013.01); *H04L 5/0007* (2013.01); *H04W 74/0833* (2013.01); *H04W 74/0838* (2024.01)

(58) Field of Classification Search
CPC ..... H04L 5/0026; H04L 5/0016; H04L 5/005; H04L 5/0048; H04J 11/0073; H04J 11/0076; H04J 13/18; H04J 13/004
See application file for complete search history.

(56) References Cited

U.S. PATENT DOCUMENTS

| | | | |
|---|---|---|---|
| 2019/0364603 A1* | 11/2019 | Qian ................... | H04L 27/2607 |
| 2019/0387550 A1* | 12/2019 | Pan ................... | H04W 74/0833 |
| 2022/0123888 A1* | 4/2022 | Yuan ..................... | H04L 5/0053 |
| 2022/0231806 A1* | 7/2022 | Hu ........................ | H04L 5/0053 |
| 2022/0386381 A1* | 12/2022 | Chitti ................. | H04W 74/004 |

FOREIGN PATENT DOCUMENTS

| | | |
|---|---|---|
| CN | 111565471 A | 8/2020 |
| WO | 2018031848 A1 | 2/2018 |
| WO | 2018182385 A1 | 10/2018 |
| WO | 2019061257 A1 | 4/2019 |
| WO | 2020199000 A1 | 10/2020 |

OTHER PUBLICATIONS

Qualcomm Incorporated: "PRACH design consider ation",3GPP Draft; R1-1708574, May 2017, 23 pages.
Vivo: "Discussion on channel structure for 2-step RACH", 3GPP Draft; R1-1906124, May 2019, 14 pages.
International Search Report issued in corresponding International Application No. PCT/CN2021/123567, mailed Jan. 14, 2022, 4 pages.
Zte et al, "Remaining issues of msgA channel structure", 3GPP TSG RAN WG1 #98bis R1-1910002, Oct. 2019, 26 pages.

* cited by examiner

12

Network side
device

11

11

Terminal

Terminal

Start

A terminal determines, according to a rule for sorting T second preamble sequences, a target index of a second preamble sequence

201

The terminal establishes, based on the target index of the second preamble sequence, mapping to an SSB

202

End

PREAMBLE SEQUENCE MAPPING METHOD AND APPARATUS, AND TERMINAL

CROSS-REFERENCE TO RELATED APPLICATIONS

This application is a continuation of International Application No. PCT/CN2021/123567, filed on Oct. 13, 2021, which claims priority to Chinese Patent Application No. 202011109242.6, filed on Oct. 16, 2020. The entire contents of each of the above-referenced applications are expressly incorporated herein by reference.

TECHNICAL FIELD

This application relates to the field of communications technologies, and in particular, to a preamble sequence mapping method and apparatus, and a terminal.

BACKGROUND

Wave beams are used in 5G New Radio (NR) random access procedures in which there are a plurality of occasions for sending Synchronization Signal and Physical Broadcast Channel blocks (Synchronization Signal and PBCH blocks (SSB)) within a time-domain period with corresponding serial numbers that correspond to different wave beams. However, for a terminal, the terminal can have an opportunity to send a random access preamble sequence only when the terminal is within the coverage of beam scanning signals of the SSBs. When receiving a preamble from the terminal, a network side gets to know an optimal beam for downlink. Therefore, an SSB needs to be associated with a preamble, while a preamble can be sent only at a Random Access Channel occasion (RACH occasion), so that an SSB is associated with a RACH Occasion (RO).

A quantity N of SSBs associated with each RACH occasion and a quantity R of contention-based preambles associated with each SSB are configured in a higher layer by using parameters. A quantity of contention-based preambles within one RACH occasion is R×max (1, N).

There are two types of configurations of N as follows:

(a) N<1. In this case, one SSB is mapped to 1/N continuous valid RACH occasions (in frequency domain). For example, N=¼. In this case, one SSB is mapped to four RACH occasions. Further, R preambles with continuous indices are mapped to an SSB n, and each valid RACH occasion starts with a preamble index 0. For example, R=4. In this case, on each RACH occasion, indices of four contention-based preambles corresponding to an SSB associated with the RACH occasion are {0, 1, 2, 3}.

(b) N≥1. In this case, N SSBs are mapped to one valid RACH occasion (in frequency domain). For example, N=2. In this case, two SSBs are mapped to one RACH occasion. Further, R preambles with continuous indices are mapped to an SSB n, and each valid RACH occasion $$n \times N^{total}_{preamble}/N,$$

where $0 \le n \le N-1$. For example, N=2, and $$N^{total}_{preamble} = 64.$$

In this case, two SSBs are mapped to one RACH occasion, and the SSB n=0 or 1. When n=0, indices of preambles corresponding to the SSB 0 start with 0; or when n=1, indices of preambles corresponding to the SSB 1 start with 32.

$$N^{total}_{preamble}$$

is an integer multiple of N.

In a B52.6 GHz system, if an SCS of a larger value, for example, 480 KHz or 960 KHz, is used, in a case in which a specific coverage is required, a value of zeroCorrelationZoneConfig (zeroCorrelationZoneConfig, $N_{cs}$) is probably too large, and a large quantity of root sequences are needed for generating 64 preamble sequences. For example, for a sequence whose length is 139, if a value of $N_{cs}$ is greater than 69, each root sequence cannot be cyclically shifted, and therefore, 64 root sequences are needed for generating 64 preamble sequences. In this case, a same root sequence may be used between several cells adjacent to each other, causing a difficulty for users at the edge of the cells to determine which cell has sent a preamble sequence and a mistake of accessing to a wrong cell.

In view of the above-mentioned problem, an Orthogonal Cover Code (OCC) may be introduced for extending preamble sequences. However, a conventional manner of mapping a preamble sequence to an SSB is not entirely applicable for mapping a preamble sequence processed with OCC to an SSB.

SUMMARY

Embodiments of this application provide a preamble sequence mapping method and apparatus, and a terminal.

According to a first aspect, an embodiment of this application provides a preamble sequence mapping method, including:

A terminal determines, according to a rule for sorting T second preamble sequences, a target index of a second preamble sequence, where the T second preamble sequences are all or some of sequences obtained after the terminal performs code-division on M first preamble sequences by using Q OCCs; and the terminal establishes, based on the target index of the second preamble sequence, mapping to an SSB, where Q is an integer greater than or equal to 1, M is an integer greater than or equal to 1, and T is an integer greater than or equal to 2.

According to a second aspect, an embodiment of this application provides a preamble sequence mapping apparatus, applied to a terminal and including:

a determining module, configured to determine, according to a rule for sorting T second preamble sequences, a target index of a second preamble sequence, where the T second preamble sequences are all or some of sequences obtained after the terminal performs code-division on M first preamble sequences by using Q OCCs; and a first mapping module, configured to establish, based on the target index of the second preamble sequence, mapping to an SSB, where Q is an integer greater than or equal to 1, M is an integer greater than or equal to 1, and T is an integer greater than or equal to 2.

According to a third aspect, a terminal is provided. The terminal includes a processor, a memory, and a program or an instruction that is stored in the memory and that can be run on the processor, where when the program or the instruction is executed by the processor, the steps of the method according to the first aspect are implemented.

A fourth aspect provides a readable storage medium. The readable storage medium stores a program or an instruction, and when the program or the instruction is executed by a processor, the steps of the method according to the first aspect are implemented.

A fifth aspect provides a chip. The chip includes a processor and a communications interface, the communications interface is coupled to the processor, and the processor is configured to run a program or an instruction of a network side device to implement the method according to the first aspect.

According to a sixth aspect, a computer program product is provided. The computer program product is stored in a non-volatile storage medium. The program product is configured to be executed by at least one processor to implement the method according to the first aspect.

In the embodiments of this application, for all or some of the second preamble sequences obtained after the terminal performs code-division on the M first preamble sequences by using the Q OCCs, the target index corresponding to the second preamble sequence is re-determined according to the sorting rule, so that mapping to an SSB is established based on the re-determined target index of the second preamble sequence.

DETAILED DESCRIPTION

The following clearly describes the technical solutions in the embodiments of this application with reference to the accompanying drawings in the embodiments of this application. Apparently, the described embodiments are some but not all of the embodiments of this application. Based on the embodiments of this application, all other embodiments obtained by a person of ordinary skill in the art without creative efforts shall fall within the protection scope of this application.

The terms "first", "second", and the like in the description and the claims of this application are used to distinguish between similar objects, and do not need to be used to describe a specific order or sequence. It should be understood that, data used in such a way are interchangeable in proper circumstances, so that the embodiments of this application can be implemented in an order other than the order illustrated or described herein. Objects classified by "first", "second", and the like are usually of a same type, and the number of objects is not limited. For example, there may be one or more first objects. In addition, in the specification and the claims, "and/or" represents at least one of connected objects, and a character "/" generally represents an "or" relationship between associated objects.

It should be noted that, the technologies described in the embodiments of this application are not limited to a Long Term Evolution (LTE)/LTE-Advanced (LTE-A) system, and can also be used in other wireless communications systems such as Code Division Multiple Access (CDMA), Time Division Multiple Access (TDMA), Frequency Division Multiple Access (FDMA), Orthogonal Frequency Division Multiple Access (OFDMA), Single-carrier Frequency-Division Multiple Access (SC-FDMA), and another system. The terms "system" and "network" in the embodiments of this application may be used interchangeably. The technologies described can be applied to both the systems and the radio technologies mentioned above as well as to other systems and radio technologies. However, the following descriptions describe an NR system for example purposes, and NR terms are used in most of the following descriptions, although these technologies can also be applied to an application other than an NR system application, for example, a 6th Generation (6G) communications system.

Figure 1:
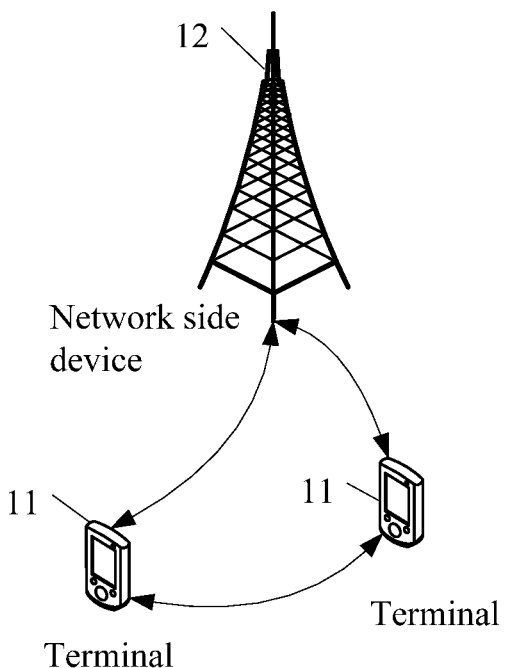
FIG. 1 is a block diagram of a wireless communications system to which embodiments of this application can be applied.

FIG. 1 is a block diagram of a wireless communications system to which an embodiment of this application may be applied. The wireless communications system includes a terminal 11 and a network side device 12. The terminal 11 may also be referred to as a terminal device or a User Equipment (UE). The terminal 11 may be a terminal side device such as a mobile phone, a tablet personal computer, a laptop computer, or a notebook computer, a Personal Digital Assistant (PDA), a palmtop computer, a netbook, an Ultra-Mobile Personal Computer (UMPC), a Mobile Internet Device (MID), a wearable device, a Vehicle User Equipment (VUE), or a Pedestrian User Equipment, PUE). The wearable device includes a band, a headset, eyeglasses, or the like. It should be noted that a specific type of the terminal 11 is not limited in the embodiments of this application. The network side device 12 may be a base station or a core network device. The base station may be referred to as a Node B, an evolved Node B, an access point, a Base Transceiver Station (BTS), a radio base station, a radio transceiver, a Basic Service Set (BSS), an Extended Service Set (ESS), a Node B, an evolved Node B (eNB), a home Node B, a home evolved Node B, a Wireless Local Area Network (WLAN) access point, a Wireless Fidelity (Wi-Fi) node, a Transmission Reception Point (TRP), or another specific appropriate term in the art, provided that the same technical effects are achieved, the base station is not limited to specific technical vocabulary. It should be noted that in the embodiments of this application, a base station in the NR system is merely used as an example, but does not limit a specific type of the base station.

The preamble sequence mapping method and apparatus, and the terminal according to the embodiments of this application are described in detail below in conjunction with the accompanying drawings in specific embodiments and application scenarios thereof.

Figure 2:
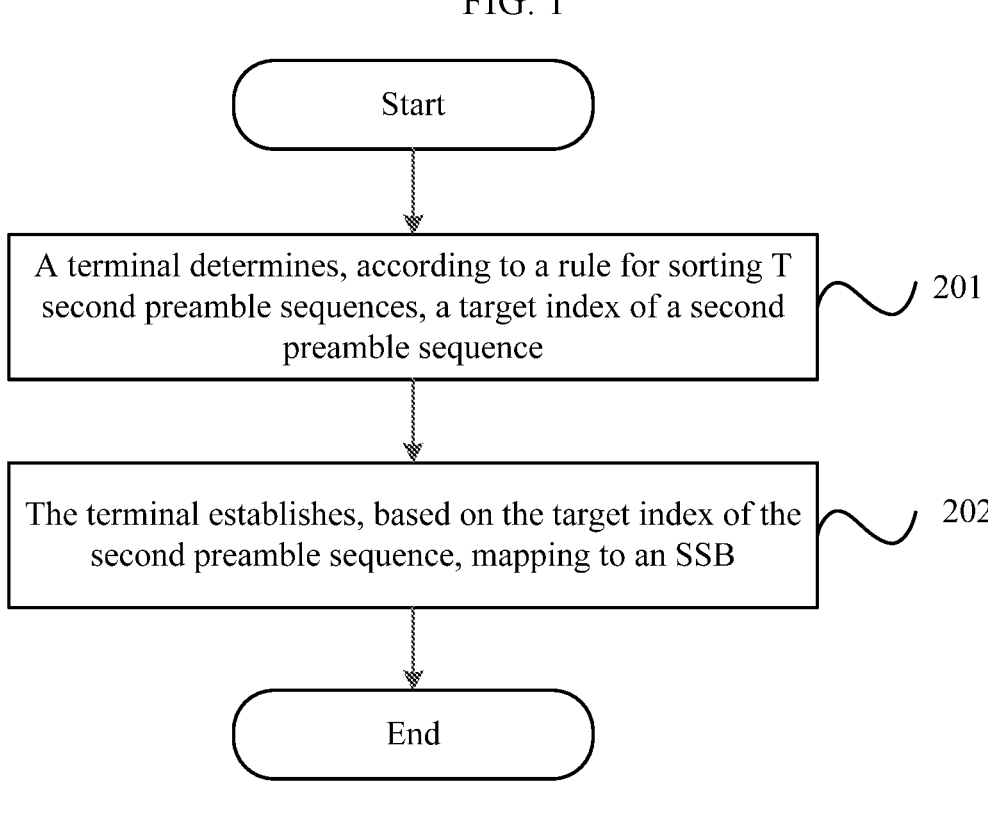
FIG. 2 is a flowchart of steps of a preamble sequence mapping method according to an embodiment of this application.

As shown in FIG. 2, an embodiment of this application provides a preamble sequence mapping method, including:
  step 201: A terminal determines, according to a rule for sorting T second preamble sequences, a target index of a second preamble sequence, where the T second preamble sequences are all or some of sequences obtained after the terminal performs code-division on M first preamble sequences by using Q OCCs; and
  step 202: The terminal establishes, based on the target index of the second preamble sequence, mapping to an SSB, where
  Q is an integer greater than or equal to 1, M is an integer greater than or equal to 1, and T is an integer greater than or equal to 2.

In this embodiment of this application, in step 202, for that the terminal establishes, based on the target index of the second preamble sequence, mapping to an SSB, a mapping rule is as follows:

N (a quantity of SSBs, configured in a higher layer, associated with each RO is N) is less than 1. In this case, R (a quantity of preamble sequences, configured in a higher layer, associated with each SSB is R) second preamble sequences with continuous target indices are mapped to an SSB n, and each valid RO starts with a target index 0 of a preamble sequence.

N is greater than or equal to 1. In this case, R second preamble sequences with continuous target indices are mapped to an SSB n, and each valid RO starts with a target index $$n \times N_{preamble}^{total}/N$$

of a preamble sequence.

In an embodiment, the rule for sorting the T second preamble sequences includes any one of the following:
  a first sorting rule of sorting first based on a serial number of a first preamble sequence and then based on a serial number of an OCC;
  a second sorting rule of sorting first based on a serial number of an OCC and then based on a serial number of a first preamble sequence; and
  a third sorting rule based on a group index after the second preamble sequences corresponding to different OCCs are grouped according to a preset rule, where an order within a group includes: first based on a serial number of a first preamble sequence and then based on a serial number of an OCC, or first based on a serial number of an OCC and then based on a serial number of a first preamble sequence.

For example, M=32, Q=2. In this case, OCC1 corresponds to 32 preambles {$OCC_{1,1}$, $OCC_{1,2}$, . . . , $OCC_{1,M}$}, OCC2 corresponds to 32 preambles {$OCC_{2,1}$, $OCC_{2,2}$, . . . , $OCC_{2,M}$}:
  In a case in which the rule for sorting the T second preamble sequences is the first sorting rule, the T second preamble sequences are {$OCC_{1,1}$, $OCC_{1,2}$, . . . , $OCC_{1,M}$, . . . , $OCC_{2,1}$, $OCC_{2,2}$, . . . , $OCC_{2,M}$};

in a case in which the rule for sorting the T second preamble sequences is the second sorting rule, the T second preamble sequences are {$OCC_{1,1}$, $OCC_{2,1}$, $OCC_{1,2}$, $OCC_{2,2}$, . . . , $OCC_{1,M}$, $OCC_{2,M}$}; and
  in a case in which the rule for sorting the T second preamble sequences is the third sorting rule, and each group includes two preamble sequences, the T second preamble sequences are {$OCC_{1,1}$, $OCC_{1,2}$, $OCC_{2,1}$, $OCC_{2,1}$, $OCC_{1,3}$, . . . , $OCC_{2,M-1}$, $OCC_{2,M}$}.

In an embodiment, in a case in which the rule for sorting the T second preamble sequences is the first sorting rule, step 201 includes:
  determining, according to a first formula, a target index A1 of a second preamble sequence, where the first formula is:

$$A1 = m + (Q-1) \times M, \text{ where}$$

A1 is the target index of the second preamble sequence, m is an index of a first preamble sequence corresponding to the second preamble sequence, Q is a quantity of the OCCs, and M is a quantity of the first preamble sequences.

In another embodiment, in a case in which the rule for sorting the T second preamble sequences is the second sorting rule, step 201 includes:
  determining, according to a second formula, a target index A2 of a second preamble sequence, where the second formula is:

$$A2 = q + (M-1) \times Q, \text{ where}$$

A2 is the target index of the second preamble sequence, q is an index of an OCC corresponding to the second preamble sequence, M is a quantity of the first preamble sequences, and Q is a quantity of the OCCs.

In still another embodiment, in a case in which the rule for sorting the T second preamble sequences is the third sorting rule, that the terminal determines, according to the rule for sorting the T second preamble sequences, the target index of the second preamble sequence includes:
  determining, according to a third formula, a target index A3 of a second preamble sequence, where the third formula is:

$$A3 = \sum_{m=1}^{M}\sum_{q=1}^{Q}(m-1)*q; \text{ or } A3 = \sum_{q=1}^{Q}\sum_{m=1}^{M}(m-1)*q,$$

M is a quantity of the first preamble sequences, Q is a quantity of the OCCs, m is an index of a first preamble sequence corresponding to the second preamble sequence, and q is an index of an OCC corresponding to the second preamble sequence.

Because in this embodiment of this application, the second preamble sequences are all or some of preamble sequences processed with an OCC, that is, an OCC index is introduced in this application, in this embodiment of this application, in addition to mapping between an SSB index and the target index of the second preamble sequence and an RO index, mapping from an OCC index is further needed. That is, the method further includes:
  The terminal establishes mapping between an SSB index and a plurality of indices, where the plurality of indices include the target index of the second preamble sequence, an OCC index, and a random access channel occasion RO index.

The RO index includes an RO frequency domain index, an RO time domain index within a random access channel slot, and a random access channel slot index; in other words, an RO is identified by the frequency domain index, the time domain index, and the random access channel slot index.

In some embodiments, in this embodiment of this application, an order of mapping the plurality of indices includes one of the following:

the OCC index, the target index of the second preamble sequence, the RO frequency domain index, the RO time domain index within the random access channel slot, and the random access channel slot index;

the target index of the second preamble sequence, the OCC index, the RO frequency domain index, the RO time domain index within the random access channel slot, and the random access channel slot index;

the target index of the second preamble sequence, the RO frequency domain index, the OCC index, the RO time domain index within the random access channel slot, and the random access channel slot index; and the target index of the second preamble sequence, the RO frequency domain index, the RO time domain index within the random access channel slot, the OCC index, and the random access channel slot index.

In an embodiment, in this application, that the terminal establishes mapping between the SSB index and the plurality of indices includes:

The terminal establishes mapping between the SSB index and the target index of the second preamble sequence and the RO index preferentially, and maps each RO index to a same OCC index, or maps each RO index to OCC indices that are not entirely the same.

For example, RO indices are 0, 1, 2, and 3 respectively; and OCC indices are 1 and 2.

In a case in which each RO index is mapped to a same OCC index, an RO 0 is mapped to an OCC 1, an RO 1 is mapped to the OCC 1, an RO 2 is mapped to the OCC 1, and an RO 3 is mapped to the OCC 1; or an RO 0 is mapped to an OCC 2, an RO 1 is mapped to the OCC 2, an RO 2 is mapped to the OCC 2, and an RO 3 is mapped to an OCC 2.

In a case in which each RO index is mapped to all OCC indices that are not entirely the same, an RO 0 is mapped to an OCC 1, an RO 1 is mapped to an OCC 2, an RO 2 is mapped to the OCC 1, and an RO 3 is mapped to the OCC 2; or an RO 0 is mapped to an OCC 2, an RO 1 is mapped to an OCC 1, an RO 2 is mapped to the OCC 2, and an RO 3 is mapped to the OCC 1. All cases are not enumerated herein. In a case in which a quantity of OCC indices is greater than or equal to a quantity of RO indices, each RO index may be mapped to different OCC indices.

It should be noted that, the preamble sequence mapping method provided in this embodiment of this application is applicable for, but is not limited to, the following scenarios: contention-based random access, contention-free random access, beam failure recovery, and a system information request.

To better describe the preamble sequence mapping method provided in the embodiments of this application, several examples are used below for description. A quantity of SSBs, configured in a higher layer, associated with each random access channel occasion RO is N, and a quantity of preamble sequences, configured in a higher layer, associated with each SSB is R.

Example 1: A Scenario in which N is Less than 1

When $N=\frac{1}{4}$, it is assumed that a configured preamble quantity M=32, an OCC quantity Q=2. To be specific, in OCC1, there are 32 preambles {$OCC_{1,1}$, $OCC_{1,2}$, . . . , $OCC_{1,M}$}, and in OCC2, there are also 32 preambles {$OCC_{2,1}$, $OCC_{2,2}$, . . . , $OCC_{2,M}$}.

Figure 3:
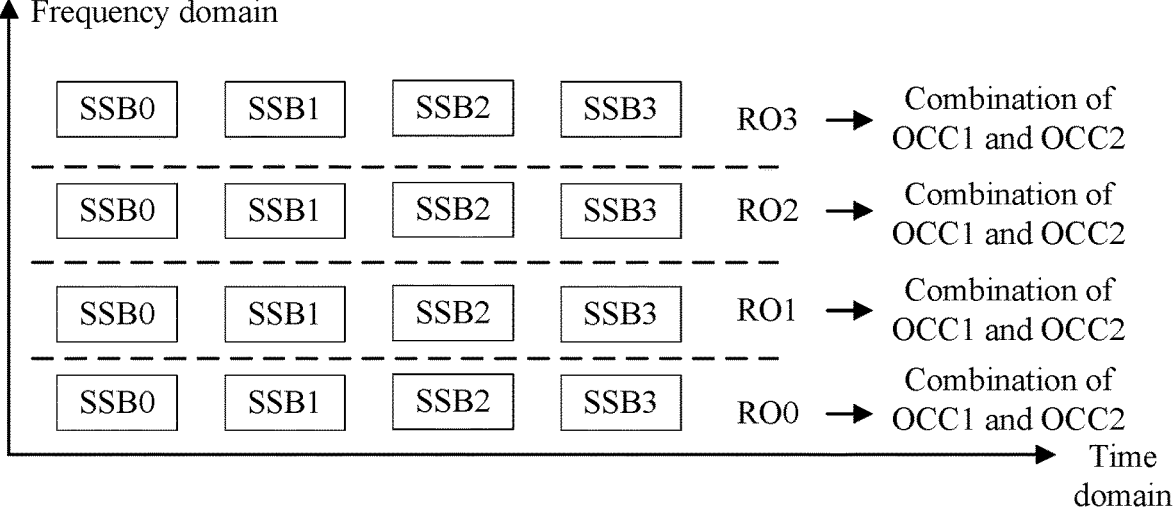
FIG. 3 is a first schematic diagram of mapping in Example 1 according to an embodiment of this application.

As shown in FIG. 3, each RO is mapped to combined second preamble sequences.

A first sorting pattern is, for example, {$OCC_{1,1}$, $OCC_{1,2}$, . . . , $OCC_{1,M}$, . . . , $OCC_{2,1}$, $OCC_{2,2}$, . . . , $OCC_{2,M}$};

a second sorting pattern is, for example, {$OCC_{1,1}$, $OCC_{2,1}$, $OCC_{1,2}$, $OCC_{2,2}$, . . . , $OCC_{1,M}$, $OCC_{2,M}$}; and a third sorting pattern is, for example, {$OCC_{1,1}$, $OCC_{1,2}$, $OCC_{2,1}$, $OCC_{2,1}$, $OCC_{1,3}$, . . . , $OCC_{2,M-1}$, $OCC_{2,M}$}, where an example of two preamble sequences in each OCC is used.

Figure 4:
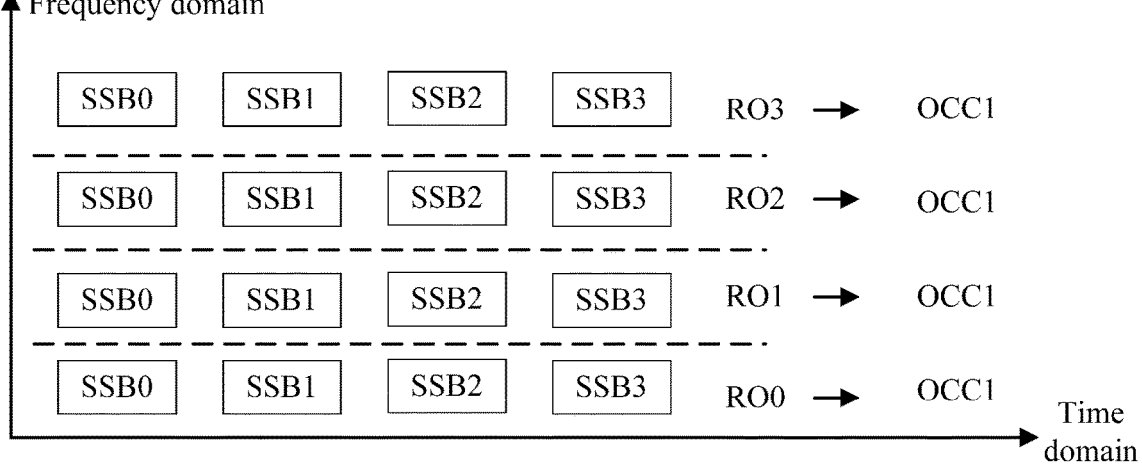
FIG. 4 is a second schematic diagram of mapping in Example 1 according to an embodiment of this application.

A case in which mapping between an SSB and an RO index and a preamble index is established preferentially and a same preamble sequence is selected for each RO is shown in FIG. 4.

Figure 5:
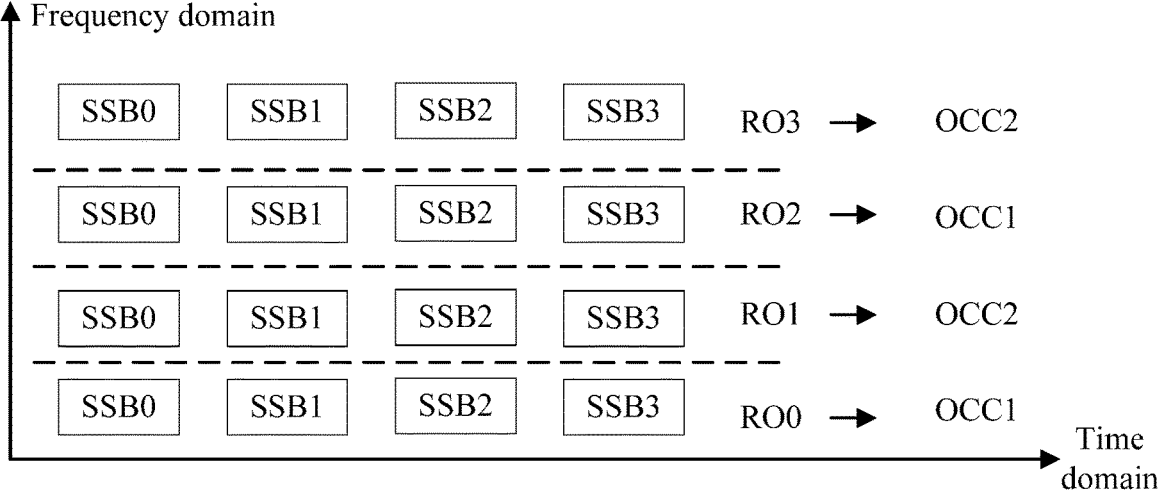
FIG. 5 is a third schematic diagram of mapping in Example 1 according to an embodiment of this application.

A case in which mapping between an SSB and an RO index and a preamble index is established preferentially and preamble sequences that are not entirely the same are selected for each RO is shown in FIG. 5.

Example 2: A Scenario in which N is Greater than or Equal to 1

When N=2, it is assumed that a configured preamble quantity M=32, an OCC quantity Q=2. To be specific, in OCC1, there are 32 preambles {$OCC_{1,1}$, $OCC_{1,2}$, . . . , $OCC_{1,M}$}, and in OCC2, there are also 32 preambles {$OCC_{2,1}$, $OCC_{2,2}$, . . . , $OCC_{2,M}$}.

Figure 6:
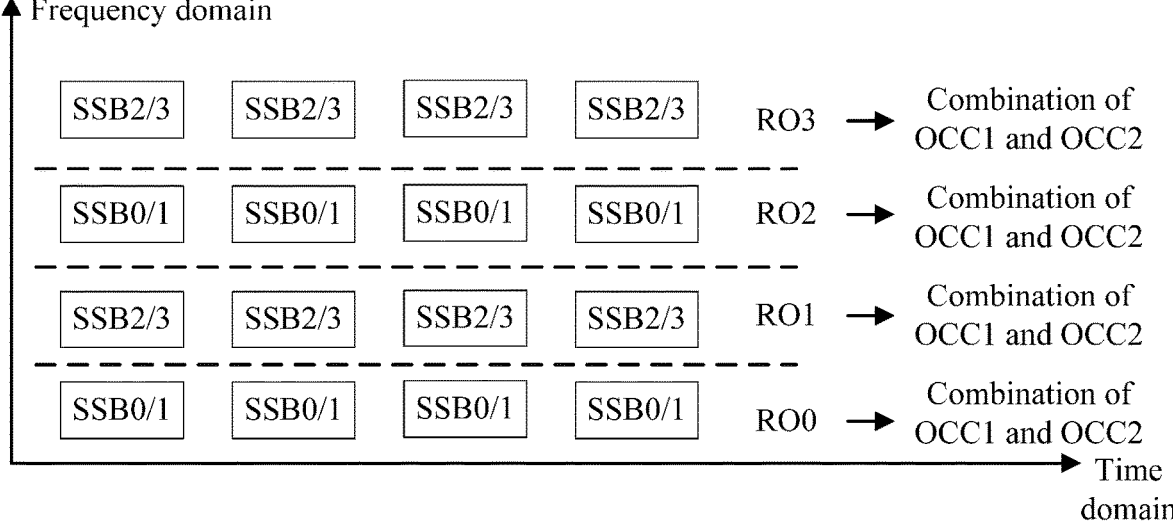
FIG. 6 is a first schematic diagram of mapping in Example 2 according to an embodiment of this application.

As shown in FIG. 6, each RO is mapped to combined second preamble sequences.

A first sorting pattern is, for example, {$OCC_{1,1}$, $OCC_{1,2}$, . . . , $OCC_{1,M}$, . . . , $OCC_{2,1}$, $OCC_{2,2}$, . . . , $OCC_{2,M}$};

a second sorting pattern is, for example, {$OCC_{1,1}$, $OCC_{2,1}$, $OCC_{1,2}$, $OCC_{2,2}$, . . . , $OCC_{1,M}$, $OCC_{2,M}$}; and a third sorting pattern is, for example, {$OCC_{1,1}$, $OCC_{1,2}$, $OCC_{2,1}$, $OCC_{2,1}$, $OCC_{1,3}$, . . . , $OCC_{2,M-1}$, $OCC_{2,M}$}, where an example of two preamble sequences in each OCC is used.

In this solution, 64 preambles after a combination of $OCC_1$ and $OCC_2$ are selected. That is, for SSB0, a preamble index starts with 0; and for SSB1, a preamble index starts with 32. For SSB2, a preamble index starts with 0; and for SSB3, a preamble index starts with 32.

Figure 7:
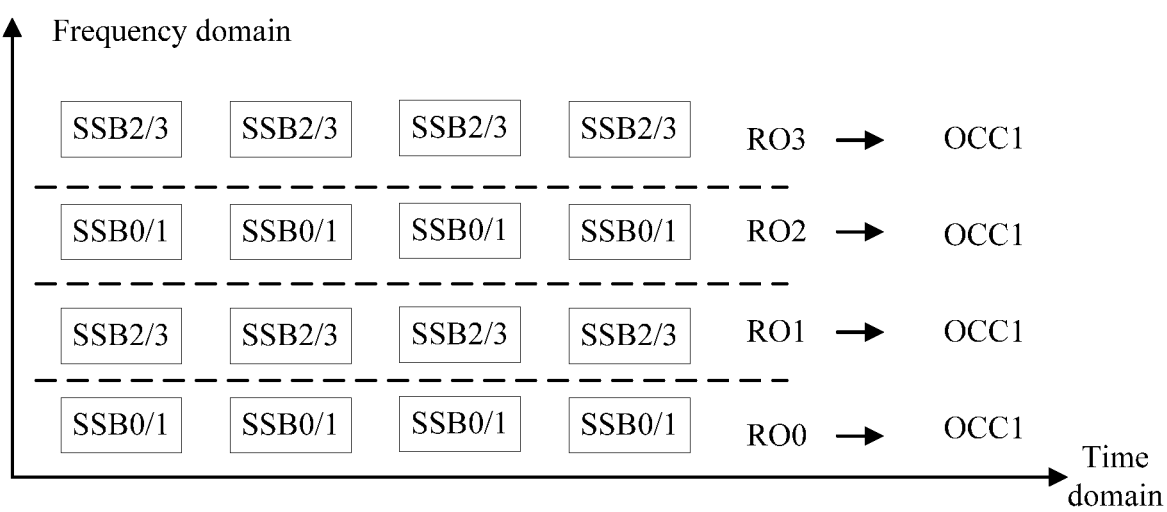
FIG. 7 is a second schematic diagram of mapping in Example 2 according to an embodiment of this application.

A case in which mapping between an SSB and an RO index and a preamble index is established preferentially and a same preamble sequence is selected for each RO is shown in FIG. 7.

In this solution, only 32 preambles in OCC1 are selected, and it may be specified that $$N_{preamble}^{total} = M.$$

That is, for SSB0, a preamble index starts with 0; and for SSB1, a preamble index starts with 16. For SSB2, a preamble index starts with 0; and for SSB3, a preamble index starts with 16.

Figure 8:
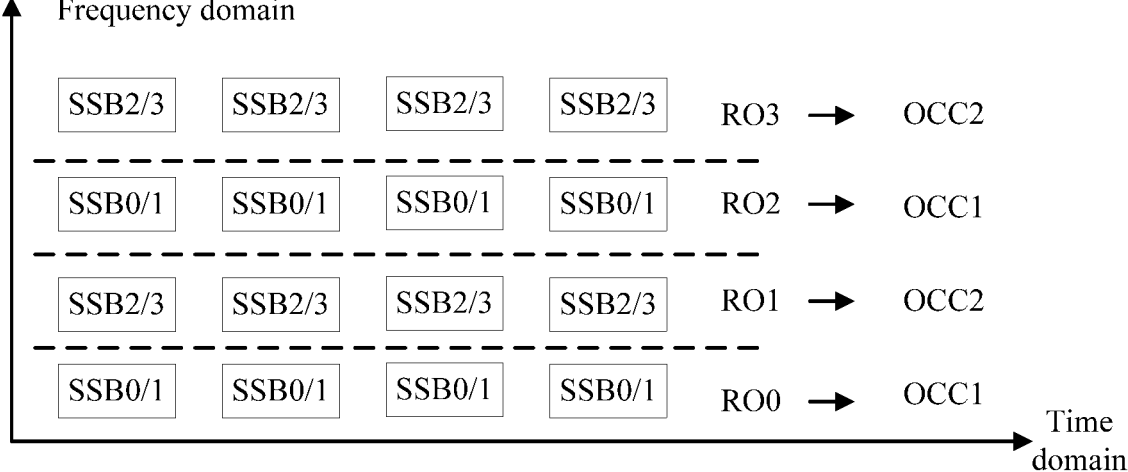
FIG. 8 is a third schematic diagram of mapping in Example 2 according to an embodiment of this application.

A case in which mapping between an SSB and an RO index and a preamble index is established preferentially and preamble sequences that are not entirely the same are selected for each RO is shown in FIG. 8.

In this solution, SSB0/1 selects the 32 preambles in OCC₁, SSB2/3 selects 32 preambles in OCC2. It may be specified that $$N_{preamble}^{total} = M.$$

That is, for SSB0, a preamble index starts with preamble0 in the 32 preambles in OCC1; and for SSB1, a preamble index starts with preamble16 in the 32 preambles in OCC1. That is, for SSB2, a preamble index starts with preamble0 in the 32 preambles in OCC2; and for SSB3, a preamble index starts with preamble16 in the 32 preambles in OCC2.

In conclusion, in this embodiment of this application, for all or some of the second preamble sequences obtained after the terminal performs code-division on the M first preamble sequences by using the Q OCCs, the target index corresponding to the second preamble sequence is re-determined according to the sorting rule, so that mapping to an SSB is established based on the re-determined target index of the second preamble sequence.

It should be noted that the preamble sequence mapping method provided in the embodiments of this application may be performed by a preamble sequence mapping apparatus or a control module that is in the preamble sequence mapping apparatus and that is configured to load the preamble sequence mapping method. In an embodiment of this application, that the preamble sequence mapping apparatus performs the preamble sequence mapping method is used as an example to describe the preamble sequence mapping apparatus provided in this embodiment of this application.

Figure 9:
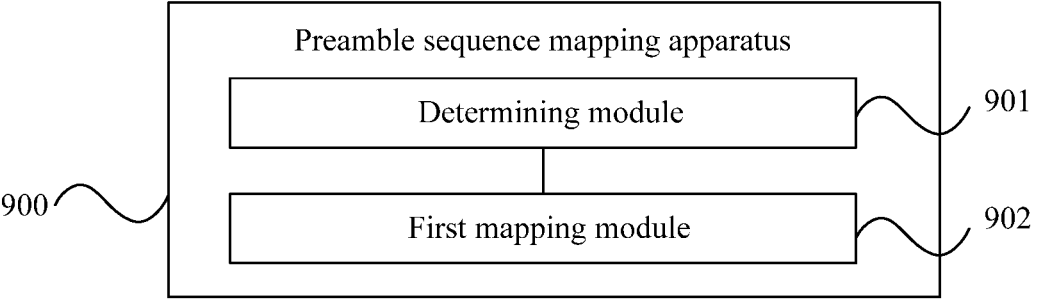
FIG. 9 is a schematic diagram of a structure of a preamble sequence mapping apparatus according to an embodiment of this application.

As shown in FIG. 9, an embodiment of this application further provides a preamble sequence mapping apparatus 900, applied to a terminal and including:

a determining module 901, configured to determine, according to a rule for sorting T second preamble sequences, a target index of a second preamble sequence, where the T second preamble sequences are all or some of sequences obtained after the terminal performs code-division on M first preamble sequences by using Q OCCs; and a first mapping module 902, configured to establish, based on the target index of the second preamble sequence, mapping to an SSB, where Q is an integer greater than or equal to 1, M is an integer greater than or equal to 1, and T is an integer greater than or equal to 2.

In an embodiment, the rule for sorting the T second preamble sequences includes any one of the following:

a first sorting rule of sorting first based on a serial number of a first preamble sequence and then based on a serial number of an OCC;

a second sorting rule of sorting first based on a serial number of an OCC and then based on a serial number of a first preamble sequence; and a third sorting rule based on a group index after the second preamble sequences corresponding to different OCCs are grouped according to a preset rule, where an order within a group includes: first based on a serial number of a first preamble sequence and then based on a serial number of an OCC, or first based on a serial number of an OCC and then based on a serial number of a first preamble sequence.

In an embodiment, in a case in which the rule for sorting the T second preamble sequences is the first sorting rule, the determining module includes:

a first determining submodule, configured to determine, according to a first formula, a target index A1 of a second preamble sequence, where the first formula is:

$$A1 = m + (Q-1) \times M, \text{ where}$$

A1 is the target index of the second preamble sequence, m is an index of a first preamble sequence corresponding to the second preamble sequence, Q is a quantity of the OCCs, and M is a quantity of the first preamble sequences.

In an embodiment, in a case in which the rule for sorting the T second preamble sequences is the second sorting rule, the determining module includes:

a second determining submodule, configured to determine, according to a second formula, a target index A2 of a second preamble sequence, where the second formula is:

$$A2 = Q + (M-1) \times Q, \text{ where}$$

A2 is the target index of the second preamble sequence, q is an index of an OCC corresponding to the second preamble sequence, M is a quantity of the first preamble sequences, and Q is a quantity of the OCCs.

In an embodiment, in a case in which the rule for sorting the T second preamble sequences is the third sorting rule, the determining module includes:

a third determining submodule, configured to determine, according to a third formula, a target index A3 of a second preamble sequence, where the third formula is:

$$A3 = \sum_{m=1}^{M} \sum_{q=1}^{Q} (m-1) * q; \text{ or } A3 = \sum_{q=1}^{Q} \sum_{m=1}^{M} (m-1) * q,$$

M is a quantity of the first preamble sequences, Q is a quantity of the OCCs, m is an index of a first preamble sequence corresponding to the second preamble sequence, and q is an index of an OCC corresponding to the second preamble sequence.

In an embodiment, the apparatus further includes:

a second mapping module, configured to establish mapping between an SSB index and a plurality of indices, where the plurality of indices include the target index of the second preamble sequence, an OCC index, and a random access channel occasion RO index.

In an embodiment, the RO index includes an RO frequency domain index, an RO time domain index within a random access channel slot, and a random access channel slot index.

An order of mapping the plurality of indices includes one of the following:

the OCC index, the target index of the second preamble sequence, the RO frequency domain index, the RO time domain index within the random access channel slot, and the random access channel slot index;

the target index of the second preamble sequence, the OCC index, the RO frequency domain index, the RO time domain index within the random access channel slot, and the random access channel slot index;

the target index of the second preamble sequence, the RO frequency domain index, the OCC index, the RO time domain index within the random access channel slot, and the random access channel slot index; and the target index of the second preamble sequence, the RO frequency domain index, the RO time domain index within the random access channel slot, the OCC index, and the random access channel slot index.

In an embodiment, the second mapping module includes:
a mapping submodule, configured to: establish mapping between the SSB index and the target index of the second preamble sequence and the RO index preferentially, and map each RO index to a same OCC index, or map each RO index to OCC indices that are not entirely the same.

In the embodiments of this application, for all or some of the second preamble sequences obtained after the terminal performs code-division on the M first preamble sequences by using the Q OCCs, the target index corresponding to the second preamble sequence is re-determined according to the sorting rule, so that mapping to an SSB is established based on the re-determined target index of the second preamble sequence.

It should be noted that the preamble sequence mapping apparatus provided in this embodiment of this application is an apparatus that can perform the foregoing preamble sequence mapping method. Therefore, all the embodiments of the foregoing preamble sequence mapping method are applicable for the apparatus, and a same or similar effect can be achieved.

The preamble sequence mapping apparatus in this embodiment of this application may be an apparatus, or may be a component, an integrated circuit, or a chip in a terminal. The apparatus may be a mobile electronic device, or may be a non-mobile electronic device. For example, the mobile electronic device may be a mobile phone, a tablet computer, a laptop computer, a palmtop computer, a vehicle-mounted electronic terminal, a wearable device, a UMPC, a netbook, or a PDA. The non-mobile electronic device may be a server, a Network Attached Storage (NAS), a Personal Computer (PC), a Television (TV), an automated teller machine, or a self-service machine. This is not specifically limited in this embodiment of this application.

The preamble sequence mapping apparatus in this embodiment of this application may be an apparatus with an operating system. The operating system may be an Android operating system, may be an iOS operating system, or may be another possible operating system. This is not specifically limited in this embodiment of this application.

The preamble sequence mapping apparatus provided in this embodiment of this application can implement processes implemented in the method embodiments in FIG. 1 to FIG. 8. To avoid repetition, details are not described herein again.

Figure 10:
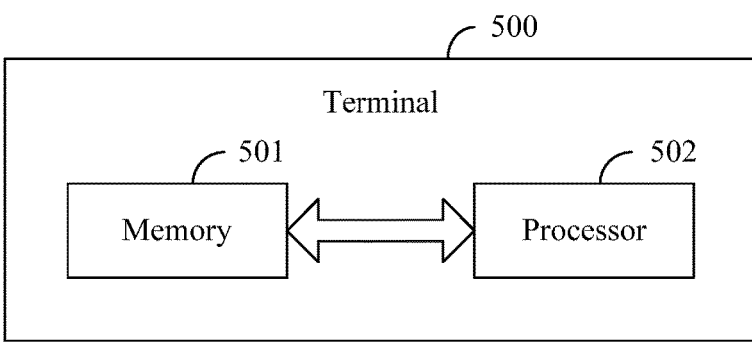
FIG. 10 is a first schematic diagram of a structure of a terminal according to an embodiment of this application.

In some embodiments, as shown in FIG. 10, an embodiment of this application further provides a terminal 500, including a processor 501, a memory 502, and a program or an instruction that is stored in the memory 502 and that can be run on the processor 501. When the program or the instruction is executed by the processor 501, the processes in the foregoing embodiments of the preamble sequence mapping method are implemented and a same technical effect can be achieved. To avoid repetition, details are not described herein again.

Figure 11:
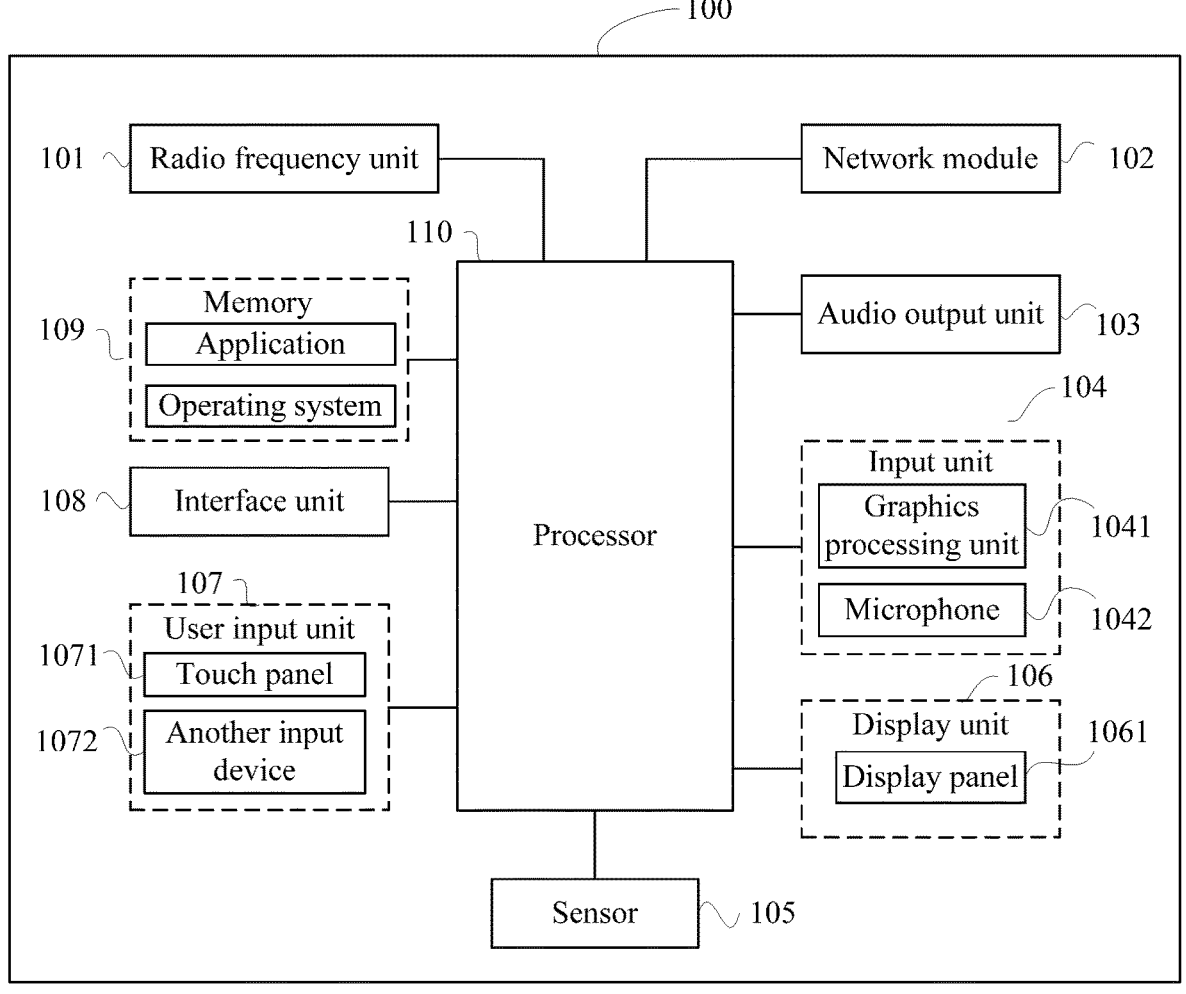
FIG. 11 is a second schematic diagram of a structure of a terminal according to an embodiment of this application.

FIG. 11 is a schematic diagram of a hardware structure of a terminal according to an embodiment of this application.

The terminal 100 includes but is not limited to components such as a radio frequency unit 101, a network module 102, an audio output unit 103, an input unit 104, a sensor 105, a display unit 106, a user input unit 107, an interface unit 108, a memory 109, and a processor 110.

A person skilled in the art can understand that the terminal 100 may further include a power supply (for example, a battery) that supplies power to each component. The power supply may be logically connected to the processor 110 by using a power supply management system, to implement functions such as charging and discharging management, and power consumption management by using the power supply management system. The terminal structure shown in FIG. 11 constitutes no limitation on the terminal, and the terminal may include more or fewer components than those shown in the figure, or combine some components, or have different component arrangements. Details are not described herein.

It should be understood that, in this embodiment of this application, the input unit 104 may include a Graphics Processing Unit (GPU) 1041 and a microphone 1042, and the graphics processing unit 1041 processes image data of a still picture or a video obtained by an image capture apparatus (for example, a camera) in a video capture mode or an image capture mode. The display unit 106 may include a display panel 1061, and the display panel 1061 may be configured in a form of a liquid crystal display, an organic light-emitting diode, or the like. The user input unit 107 includes a touch panel 1071 and another input device 1072. The touch panel 1071 is also referred to as a touchscreen. The touch panel 1071 may include two parts: a touch detection apparatus and a touch controller. The another input device 1072 may include but is not limited to a physical keyboard, a functional button (such as a volume control button or a power on/off button), a trackball, a mouse, and a joystick. Details are not described herein.

In this embodiment of this application, the radio frequency unit 101 receives downlink data from a network side device and then sends the downlink data to the processor 110 for processing; and sends uplink data to the network side device. Usually, the radio frequency unit 101 includes but is not limited to an antenna, at least one amplifier, a transceiver, a coupler, a low noise amplifier, a duplexer, and the like.

The memory 109 may be configured to store a software program or an instruction and various data. The memory 109 may mainly include a program or instruction storage area and a data storage area. The program or instruction storage area may store an operating system, and an application or an instruction required by at least one function (for example, a sound playing function or an image playing function). In addition, the memory 109 may include a high-speed random access memory, and may further include a non-volatile memory. The non-volatile memory may be a Read-Only Memory (ROM), a Programmable ROM (PROM), an Erasable PROM (EPROM), an Electrically EPROM (EEPROM), or a flash memory, for example, at least one disk storage device, a flash memory device, or another non-volatile solid-state storage device.

The processor 110 may include one or more processing units. In some embodiments, an application processor and a modem processor may be integrated into the processor 110. The application processor mainly processes an operating system, a user interface, an application, an instruction, or the like. The modem processor mainly processes wireless communications, for example, a baseband processor. It can be understood that the modem processor may not be integrated into the processor 110.

The determining module 110 is configured to: determine, according to a rule for sorting T second preamble sequences, a target index of a second preamble sequence, where the T second preamble sequences are all or some of sequences obtained after the terminal performs code-division on M first preamble sequences by using Q OCCs; and establish, based on the target index of the second preamble sequence, mapping to an SSB, where Q is an integer greater than or equal to 1, M is an integer greater than or equal to 1, and T is an integer greater than or equal to 2.

In the embodiments of this application, for all or some of the second preamble sequences obtained after the terminal performs code-division on the M first preamble sequences by using the Q OCCs, the target index corresponding to the second preamble sequence is re-determined according to the sorting rule, so that mapping to an SSB is established based on the re-determined target index of the second preamble sequence.

It should be noted that the terminal provided in this embodiment of this application is a terminal that can perform the foregoing preamble sequence mapping method, and all the embodiments of the foregoing preamble sequence mapping method are applicable for the terminal, and a same or similar effect can be achieved.

An embodiment of this application further provides a readable storage medium. The readable storage medium stores a program or an instruction, and when the program or the instruction is executed by a processor, the processes in the foregoing embodiments of the preamble sequence mapping method are implemented and a same technical effect can be achieved. To avoid repetition, details are not described herein again.

The processor is a processor in the electronic device in the foregoing embodiment. The readable storage medium includes a computer-readable storage medium such as a ROM, a Random Access Memory (RAM), a magnetic disk, an optical disc, or the like.

An embodiment of this application further provides a chip. The chip includes a processor and a communications interface, the communications interface is coupled to the processor, and the processor is configured to run a program or an instruction to implement the processes in the foregoing embodiments of the preamble sequence mapping method, and a same technical effect can be achieved. To avoid repetition, details are not described herein again.

It should be understood that the chip mentioned in this embodiment of this application may also be referred to as a system-level chip, a system chip, a chip system, or a system on a chip.

It should be noted that, in this specification, the terms "include", "comprise", or any other variant thereof are intended to cover a non-exclusive inclusion, so that a process, a method, an article, or an apparatus that includes a list of elements not only includes those elements but also includes other elements which are not expressly listed, or further includes elements inherent to such process, method, article, or apparatus. In the absence of more restrictions, an element defined by the statement "including a . . . " does not preclude the presence of other identical elements in the process, method, article, or apparatus that includes the element. In addition, it should be noted that a scope of the method and the apparatus in the embodiments of this application is not limited to: performing a function in a sequence shown or discussed, and may further include: performing a function in a basically simultaneous manner or in a reverse sequence based on an involved function. For example, the described method may be performed in a different order, and various steps may be added, omitted, or combined. In addition, features described with reference to some examples may be combined in other examples.

According to the descriptions of the foregoing implementations, a person skilled in the art may clearly understand that the foregoing method embodiments may be implemented by using software and a required universal hardware platform, or may be implemented by using hardware. In some embodiments, the technical solutions of this application or the part contributing to the prior art may be implemented in a form of a software product. The computer software product is stored in a storage medium (such as a ROM/RAM, a magnetic disk, or an optical disc) and includes several instructions for instructing a terminal (which may be a mobile phone, a computer, a server, an air conditioner, or a network device) to execute the methods described in the embodiments of this application.

The embodiments of this application are described with reference to the accompanying drawings. However, this application is not limited to the foregoing specific implementations. The foregoing specific implementations are merely examples, but are not limiting. A person of ordinary skill in the art may make many forms without departing from the objective and the scope of the claims of this application, and these forms all fall within the protection scope of this application.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A preamble sequence mapping method, comprising:

determining, by a terminal, according to a rule for sorting T second preamble sequences, a target index of a second preamble sequence, wherein the T second preamble sequences are all or some of sequences obtained after the terminal performs code-division on M first preamble sequences by using Q Orthogonal Cover Codes (OCCs); and establishing, by the terminal, based on the target index of the second preamble sequence, mapping to a Synchronization Signal and Physical Broadcast Channel block (SSB), wherein Q is an integer greater than or equal to 1, M is an integer greater than or equal to 1, and T is an integer greater than or equal to 2, wherein the rule for sorting the T second preamble sequences comprises any one of the following:

a first sorting rule of sorting first based on a serial number of a first preamble sequence and then based on a serial number of an OCC;

a second sorting rule of sorting first based on a serial number of an OCC and then based on a serial number of a first preamble sequence; or a third sorting rule based on a group index after the second preamble sequences corresponding to different OCCs are grouped according to a preset rule, wherein an order within a group comprises: first based on a serial number of a first preamble sequence and then based on a serial number of an OCC, or first based on a serial number of an OCC and then based on a serial number of a first preamble sequence.

2. The preamble sequence mapping method according to claim 1, wherein in a case in which the rule for sorting the T second preamble sequences is the first sorting rule, the determining, by a terminal according to a rule for sorting T second preamble sequences, a target index of a second preamble sequence comprises:

determining, according to a first formula, a target index A1 of a second preamble sequence, wherein the first formula is:

$$A1 = m + (Q-1) \times M, \text{ wherein}$$

A1 is the target index of the second preamble sequence, m is an index of a first preamble sequence corresponding to the second preamble sequence, Q is a quantity of the OCCs, and M is a quantity of the first preamble sequences.

3. The preamble sequence mapping method according to claim 1, wherein in a case in which the rule for sorting the T second preamble sequences is the second sorting rule, the determining, by a terminal according to a rule for sorting T second preamble sequences, a target index of a second preamble sequence comprises:

determining, according to a second formula, a target index A2 of a second preamble sequence, wherein the second formula is:

$$A2 = Q + (M-1) \times Q, \text{ wherein}$$

A2 is the target index of the second preamble sequence, q is an index of an OCC corresponding to the second preamble sequence, M is a quantity of the first preamble sequences, and Q is a quantity of the OCCs.

4. The preamble sequence mapping method according to claim 1, wherein in a case in which the rule for sorting the T second preamble sequences is the third sorting rule, the determining, by a terminal according to a rule for sorting T second preamble sequences, a target index of a second preamble sequence comprises:

determining, according to a third formula, a target index A3 of a second preamble sequence, wherein the third formula is:

$$A3 = \sum_{m=1}^{M} \sum_{q=1}^{Q} (m-1)*q; \text{ or } A3 = \sum_{q=1}^{Q} \sum_{m=1}^{M} (m-1)*q,$$

M is a quantity of the first preamble sequences, Q is a quantity of the OCCs, m is an index of a first preamble sequence corresponding to the second preamble sequence, and q is an index of an OCC corresponding to the second preamble sequence.

5. The preamble sequence mapping method according to claim 1, wherein the method further comprises:

establishing, by the terminal, mapping between an SSB index and a plurality of indices, wherein the plurality of indices comprise the target index of the second preamble sequence, an OCC index, and a Random Access Channel (RACH) Occasion (RO) index.

6. The preamble sequence mapping method according to claim 5, wherein the RO index comprises an RO frequency domain index, an RO time domain index within a random access channel slot, and a random access channel slot index; and an order of mapping the plurality of indices comprises one of the following:

the OCC index, the target index of the second preamble sequence, the RO frequency domain index, the RO time domain index within the random access channel slot, and the random access channel slot index;

the target index of the second preamble sequence, the OCC index, the RO frequency domain index, the RO time domain index within the random access channel slot, and the random access channel slot index;

the target index of the second preamble sequence, the RO frequency domain index, the OCC index, the RO time domain index within the random access channel slot, and the random access channel slot index; or the target index of the second preamble sequence, the RO frequency domain index, the RO time domain index within the random access channel slot, the OCC index, and the random access channel slot index.

7. The preamble sequence mapping method according to claim 5, the establishing, by the terminal, mapping between an SSB index and a plurality of indices comprises:

establishing, by the terminal, mapping between the SSB index and the target index of the second preamble sequence and the RO index preferentially, and mapping each RO index to a same OCC index, or mapping each RO index to OCC indices that are not entirely the same.

8. A terminal, comprising a processor; a memory having a computer program or an instruction stored thereon, wherein when executed by the processor, causes the processor to perform a preamble sequence mapping method, comprising:

determining, according to a rule for sorting T second preamble sequences, a target index of a second preamble sequence, wherein the T second preamble sequences are all or some of sequences obtained after the processor performs code-division on M first preamble sequences by using Q Orthogonal Cover Codes (OCCs); and establishing, based on the target index of the second preamble sequence, mapping to a Synchronization Signal and Physical Broadcast Channel block (SSB), wherein Q is an integer greater than or equal to 1, M is an integer greater than or equal to 1, and T is an integer greater than or equal to 2, wherein the rule for sorting the T second preamble sequences comprises any one of the following:

a first sorting rule of sorting first based on a serial number of a first preamble sequence and then based on a serial number of an OCC;

a second sorting rule of sorting first based on a serial number of an OCC and then based on a serial number of a first preamble sequence; or a third sorting rule based on a group index after the second preamble sequences corresponding to different OCCs are grouped according to a preset rule, wherein an order within a group comprises: first based on a serial number of a first preamble sequence and then based on a serial number of an OCC, or first based on a serial number of an OCC and then based on a serial number of a first preamble sequence.

9. The terminal according to claim 8, wherein in a case in which the rule for sorting the T second preamble sequences is the first sorting rule, the determining, according to a rule for sorting T second preamble sequences, a target index of a second preamble sequence comprises:

determining, according to a first formula, a target index A1 of a second preamble sequence, wherein the first formula is:

$$A1 = m + (Q-1) \times M, \text{ wherein}$$

A1 is the target index of the second preamble sequence, m is an index of a first preamble sequence corresponding to the second preamble sequence, Q is a quantity of the OCCs, and M is a quantity of the first preamble sequences.

10. The terminal according to claim 8, wherein in a case in which the rule for sorting the T second preamble sequences is the second sorting rule, the determining, according to a rule for sorting T second preamble sequences, a target index of a second preamble sequence comprises:
  determining, according to a second formula, a target index A2 of a second preamble sequence, wherein the second formula is:

$$A2 = Q + (M-1) \times Q, \text{ wherein}$$

A2 is the target index of the second preamble sequence, q is an index of an OCC corresponding to the second preamble sequence, M is a quantity of the first preamble sequences, and Q is a quantity of the OCCs.

11. The terminal according to claim 8, wherein in a case in which the rule for sorting the T second preamble sequences is the third sorting rule, the determining, according to a rule for sorting T second preamble sequences, a target index of a second preamble sequence comprises:
  determining, according to a third formula, a target index A3 of a second preamble sequence, wherein the third formula is:

$$A3 = \sum_{m=1}^{M}\sum_{q=1}^{Q}(m-1)*q; \text{ or } A3 = \sum_{q=1}^{Q}\sum_{m=1}^{M}(m-1)*q,$$

M is a quantity of the first preamble sequences, Q is a quantity of the OCCs, m is an index of a first preamble sequence corresponding to the second preamble sequence, and q is an index of an OCC corresponding to the second preamble sequence.

12. The terminal according to claim 8, wherein the method further comprises:
  establishing mapping between an SSB index and a plurality of indices, wherein the plurality of indices comprise the target index of the second preamble sequence, an OCC index, and a Random Access Channel (RACH) Occasion (RO) index.

13. The terminal according to claim 12, wherein the RO index comprises an RO frequency domain index, an RO time domain index within a random access channel slot, and a random access channel slot index; and
  an order of mapping the plurality of indices comprises one of the following:
    the OCC index, the target index of the second preamble sequence, the RO frequency domain index, the RO time domain index within the random access channel slot, and the random access channel slot index;
    the target index of the second preamble sequence, the OCC index, the RO frequency domain index, the RO time domain index within the random access channel slot, and the random access channel slot index;
    the target index of the second preamble sequence, the RO frequency domain index, the OCC index, the RO time domain index within the random access channel slot, and the random access channel slot index; or
    the target index of the second preamble sequence, the RO frequency domain index, the RO time domain index within the random access channel slot, the OCC index, and the random access channel slot index.

14. The terminal according to claim 12, the establishing mapping between an SSB index and a plurality of indices comprises:
    establishing mapping between the SSB index and the target index of the second preamble sequence and the RO index preferentially, and mapping each RO index to a same OCC index, or mapping each RO index to OCC indices that are not entirely the same.

15. A non-transitory computer readable storage medium, storing a computer program or an instruction that, when executed by a processor, causes the processor to perform a preamble sequence mapping method, comprising:
  determining, according to a rule for sorting T second preamble sequences, a target index of a second preamble sequence, wherein the T second preamble sequences are all or some of sequences obtained after the terminal performs code-division on M first preamble sequences by using Q Orthogonal Cover Codes (OCCs); and
  establishing, based on the target index of the second preamble sequence, mapping to a Synchronization Signal and Physical Broadcast Channel block (SSB), wherein
  Q is an integer greater than or equal to 1, M is an integer greater than or equal to 1, and T is an integer greater than or equal to 2,
  wherein the rule for sorting the T second preamble sequences comprises any one of the following:
  a first sorting rule of sorting first based on a serial number of a first preamble sequence and then based on a serial number of an OCC;
  a second sorting rule of sorting first based on a serial number of an OCC and then based on a serial number of a first preamble sequence; or
  a third sorting rule based on a group index after the second preamble sequences corresponding to different OCCs are grouped according to a preset rule, wherein an order within a group comprises: first based on a serial number of a first preamble sequence and then based on a serial number of an OCC, or first based on a serial number of an OCC and then based on a serial number of a first preamble sequence.

16. The non-transitory computer readable storage medium according to claim 15, wherein in a case in which the rule for sorting the T second preamble sequences is the first sorting rule, the determining, according to a rule for sorting T second preamble sequences, a target index of a second preamble sequence comprises:
  determining, according to a first formula, a target index A1 of a second preamble sequence, wherein the first formula is:

$$A1 = m + (Q-1) \times M, \text{ wherein}$$

A1 is the target index of the second preamble sequence, m is an index of a first preamble sequence corresponding to the second preamble sequence, Q is a quantity of the OCCs, and M is a quantity of the first preamble sequences.

17. The non-transitory computer readable storage medium according to claim 15, wherein in a case in which the rule for sorting the T second preamble sequences is the second sorting rule, the determining, according to a rule for sorting T second preamble sequences, a target index of a second preamble sequence comprises:
  determining, according to a second formula, a target index A2 of a second preamble sequence, wherein the second formula is:

$$A2 = Q + (M-1) \times Q, \text{ wherein}$$

A2 is the target index of the second preamble sequence, q is an index of an OCC corresponding to the second preamble sequence, M is a quantity of the first preamble sequences, and Q is a quantity of the OCCs.

* * * * *